US007870183B1

(12) United States Patent
Boivie (10) Patent No.: US 7,870,183 B1
(45) Date of Patent: *Jan. 11, 2011

(54) MULTICAST ENABLED MAIL

(75) Inventor: Richard H. Boivie, Monroe, CT (US)

(73) Assignee: International Business Machines Corporation, Armonk, NY (US)

( * ) Notice: Subject to any disclaimer, the term of this patent is extended or adjusted under 35 U.S.C. 154(b) by 1676 days.

This patent is subject to a terminal disclaimer.

(21) Appl. No.: 09/696,566

(22) Filed: Oct. 25, 2000

(51) Int. Cl.
*G06F 15/16* (2006.01)

(52) U.S. Cl. .................. 709/201; 709/238; 709/239

(58) Field of Classification Search ................ 709/200, 709/201, 206, 232, 238; 370/400, 408, 432; 714/748–749
See application file for complete search history.

(56) References Cited

U.S. PATENT DOCUMENTS

| 5,331,637 | A * | 7/1994 | Francis et al. ............. 370/408 |
| 5,541,927 | A * | 7/1996 | Kristol et al. ............. 370/408 |
| 5,757,669 | A * | 5/1998 | Christie et al. ............. 709/205 |
| 5,854,901 | A * | 12/1998 | Cole et al. ............. 709/245 |
| 5,862,329 | A * | 1/1999 | Aras et al. ............. 709/204 |
| 6,018,766 | A * | 1/2000 | Samuel et al. ............. 709/218 |
| 6,049,878 | A * | 4/2000 | Caronni et al. ............. 713/163 |
| 6,078,590 | A * | 6/2000 | Farinacci et al. ............. 370/432 |
| 6,154,463 | A * | 11/2000 | Aggarwal et al. ............. 370/408 |
| 6,182,117 | B1 * | 1/2001 | Christie et al. ............. 709/205 |
| 6,259,701 | B1 * | 7/2001 | Shur et al. ............. 370/401 |
| 6,269,085 | B1 * | 7/2001 | Provino et al. ............. 370/408 |
| 6,321,270 | B1 * | 11/2001 | Crawley ............. 709/238 |
| 6,331,983 | B1 * | 12/2001 | Haggerty et al. ............. 370/400 |
| 6,457,059 | B1 * | 9/2002 | Kobayashi ............. 709/242 |
| 6,577,599 | B1 * | 6/2003 | Gupta et al. ............. 370/236 |
| 6,587,943 | B1 * | 7/2003 | Hardjono ............. 709/206 |
| 6,625,773 | B1 * | 9/2003 | Boivie et al. ............. 709/200 |
| 6,862,279 | B1 * | 3/2005 | Imai et al. ............. 370/390 |

OTHER PUBLICATIONS

Boivie et al "Small Group Multicast: A New Solution for Multicasting on the Internet", IEEE, May-Jun. 2000.*
Klinker, "Multicast Tree Construction in Directed Networks", IEEE 1996.*
Braun, "Multicast for Small Conferences", IAM-00-008, Jul. 2000.*

* cited by examiner

*Primary Examiner*—Philip B Tran
(74) *Attorney, Agent, or Firm*—Jose Gutman; Fleit Gibbons Gutman Bongini & Bianco P.

(57) ABSTRACT

A method for distributing electronic mail efficiently across a network of information processing units and intermediate nodes. The method on an information processing unit includes receiving a mail message created by a user with a list of destinations. Also, the method further includes sending a single copy of the mail message across the network via intermediate nodes to addresses corresponding to the list of destinations using a reliable multicast technique. Also, the invention includes receiving a packet on an intermediate node where the packet contains address information for a list of destinations. Also, the invention includes determining at an intermediate node the "next hop" or "next hops" that the packet should be forwarded to and forwarding a copy of the packet to each of those "next hops".

14 Claims, 7 Drawing Sheets

MULTICAST ENABLED MAIL

CROSS-REFERENCE TO RELATED APPLICATIONS

This application is based upon the teachings of and claims priority from prior U.S. patent application Ser. No. 09/240,546, entitled "Reliable Multicast For Small Groups" filed on Jan. 29, 1999, now issued as U.S. Pat. No. 6,415,312, and U.S. patent application Ser. No. 09/240,549, entitled "Multicast Support For Small Groups", filed on Jan. 29, 1999, now issued as U.S. Pat. No. 6,502,140, and U.S. patent application Ser. No. 09/329,101, entitled "System For Multicast Communications In Packet Switched Networks" filed on Jun. 9, 1999, now issued as U.S. Pat. No. 6,625,773, which are all assigned to the same assignee as this application and the collective teachings of which are herein incorporated by reference.

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

The invention generally relates to electronic mail systems, and more particularly it relates to an improved method and apparatus for distribution of electronic mail.

2. The Prior Art

Electronic mail systems use unicast today to distribute mail to users on a network such as the Internet or an IP-based enterprise network. Unicast means that a unique copy of a mail message is sent to each of the destination machines.

Figure 1:
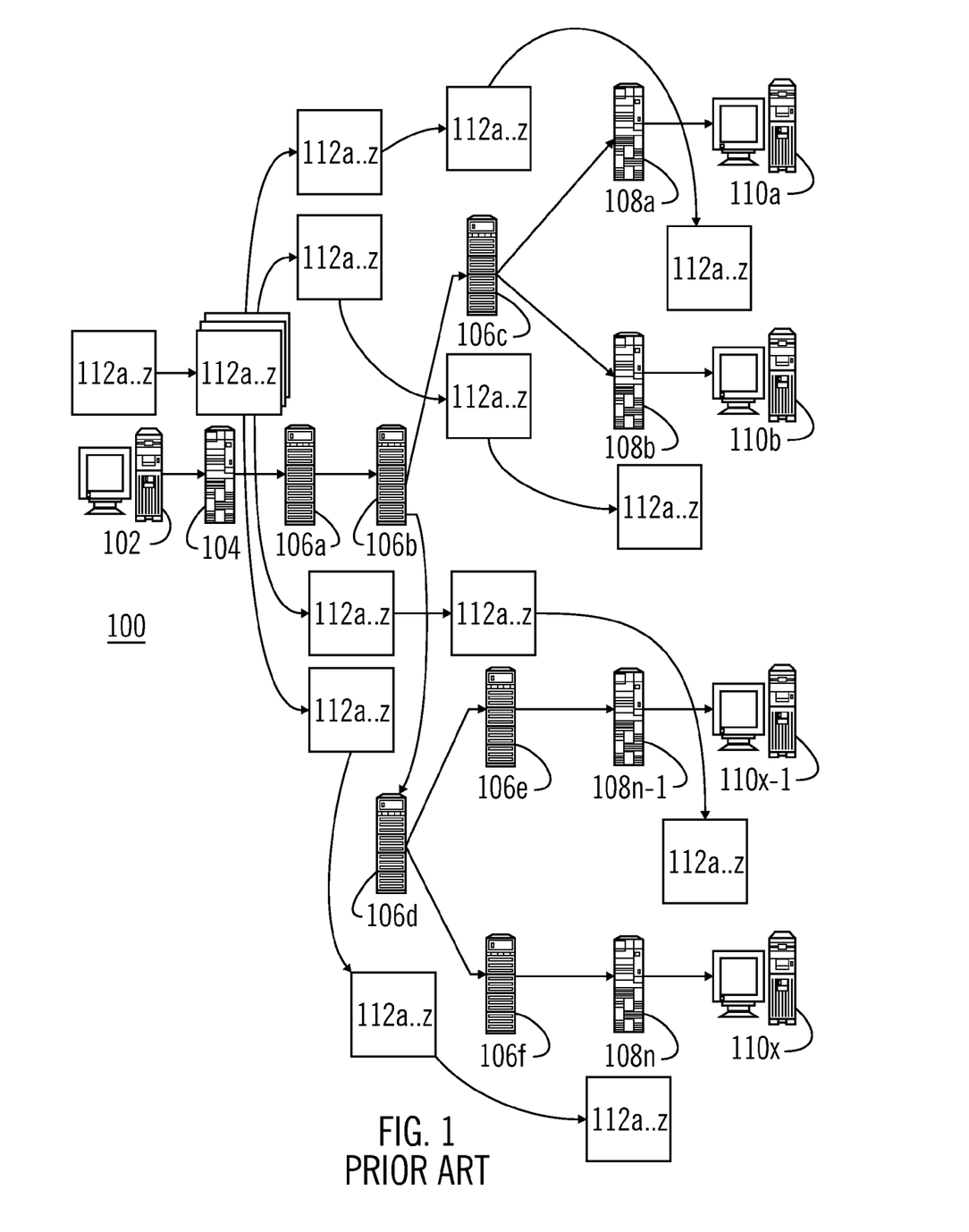
FIG. 1 illustrates a prior art system of electronic mail distribution showing the replication of mail messages in an electronic mail transmission.

FIG. 1 illustrates a prior art system of electronic mail distribution (100) showing the replication of mail messages in an electronic mail transmission. The electronic mail distribution system as shown in FIG. 1 comprises a plurality of client machines (102, 110a to 110x) which may be personal computers, dumb terminals, workstations, PDA's, cell phones, other terminal devices, or the equivalent. Also, the prior art electronic mail distribution system of FIG. 1 further comprises a plurality of mail servers (104, 108a to 108n) and a plurality of routers (106a to 106f).

An electronic mail message (112a . . . z) is composed on a client computer (102) with a plurality of recipients (a . . . z) that have mailboxes on machines (108a to 108n). At the client's mail server (104), the message (112a . . . z) is replicated into a plurality of messages (112a . . . z) and one copy of the message is sent to each of the destinations. Alternatively, the client computer (102) itself may replicate the message and send a copy to each of the destinations. In the Internet or in a TCP/IP based enterprise network, these copies might be sent using the well-known TCP/IP protocols.

Figure 2:
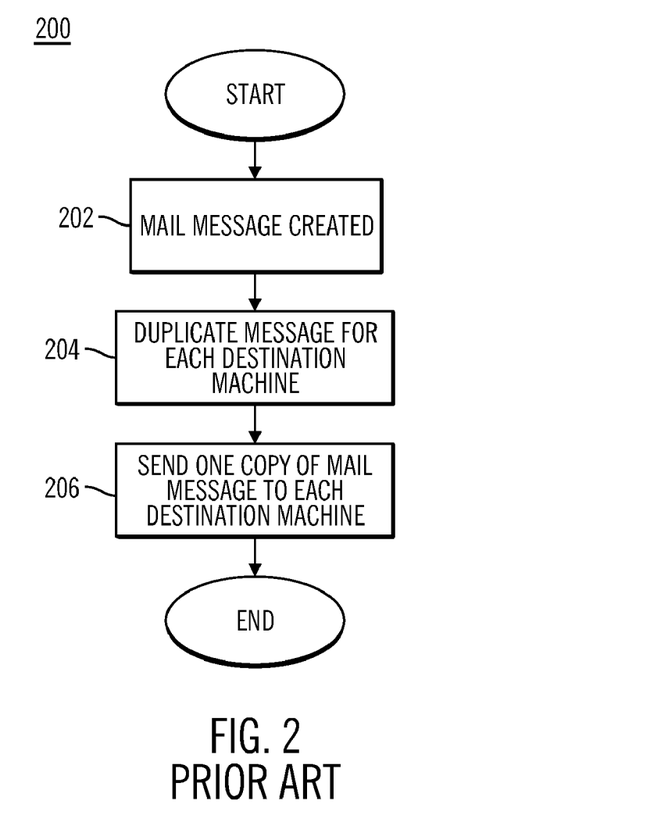
FIG. 2 illustrates a prior art functional sequence of an electronic mail distribution system.

FIG. 2 illustrates a prior art functional sequence (200) of an electronic mail distribution system. First, a mail message (112a . . . z) is created (202) at a client machine (102). Then a mail message (112a . . . z) is duplicated (204), either at a client machine (102) or at a mail server (104), for each destination (110a to 110x). Then one copy of the mail message (112a . . . z) is sent (206) to each destination mailbox on mail servers (108a to 108n).

As is well known, electronic mail uses a significant amount of bandwidth in the Internet and in enterprise networks and since mail messages are expected to increase in size as audio, image and video attachments to electronic mail become more common, electronic mail will consume even more bandwidth. This increase in the amount of bandwidth that electronic mail will consume means that either there will be less bandwidth available for other applications such as web-based applications or that more network bandwidth will be required which can be expensive. Thus, there is a need for an improved method and system for efficiently delivering electronic mail that consumes less network bandwidth.

SUMMARY OF THE INVENTION

A method for distributing electronic mail efficiently across a network of information processing units and intermediate nodes. The method on an information processing unit includes receiving a mail message created by a user with a list of destinations. Also, the method further includes sending a single copy of the mail message across the network via intermediate nodes to addresses indicated in the list of destinations using a multicast or reliable multicast technique.

The invention also includes the use of intermediate nodes that receive and forward multicast packets appropriately, i.e., in the direction of the various destinations. The forwarding of these multicast packets is accomplished, for example, as described in application Ser. No. 09/329,101, filed on Jun. 9, 1999, or via another reliable multicast mechanism.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

Exemplary Embodiment Multicast Enabled Mail

Figure 3:
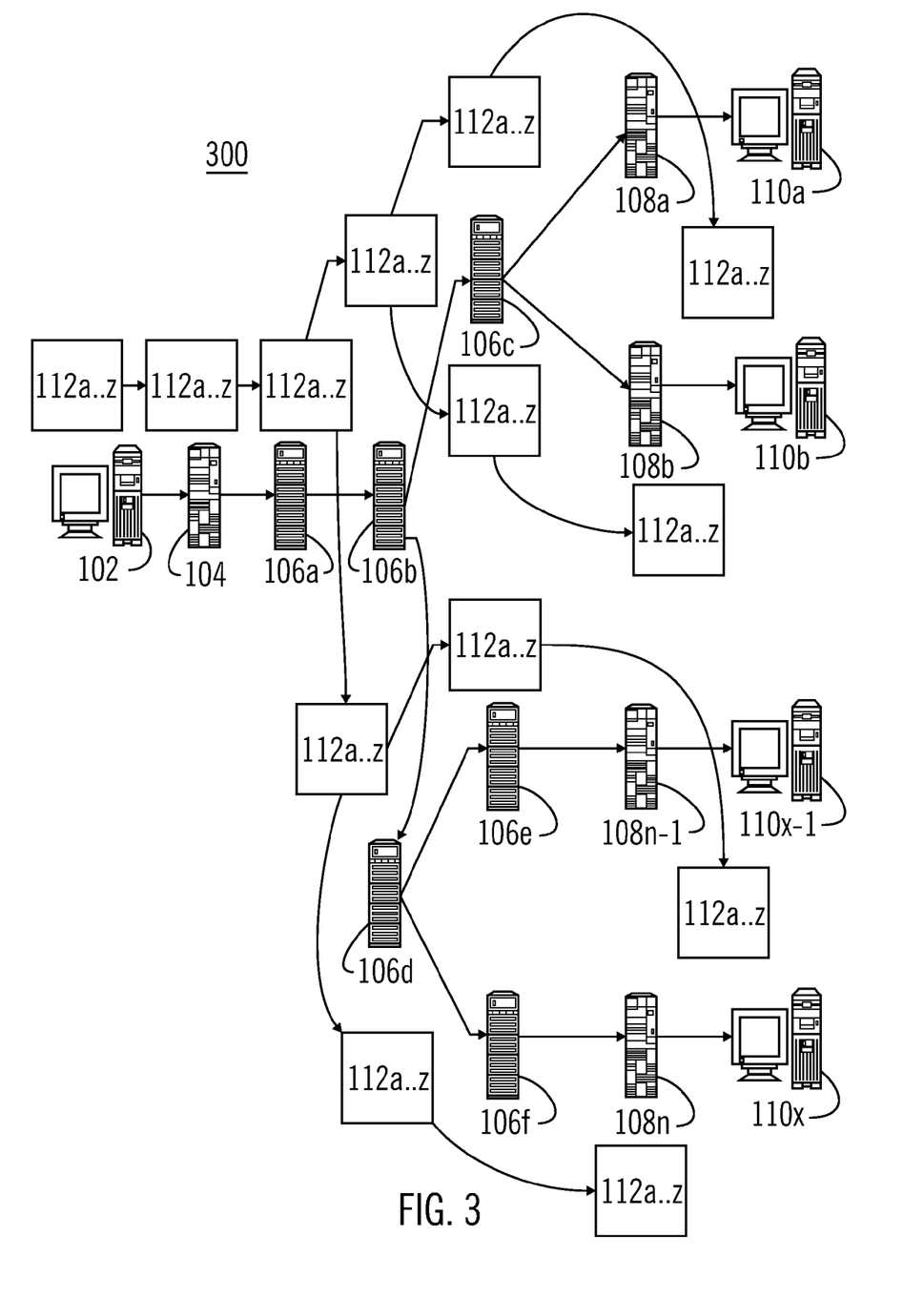
FIG. 3 illustrates an electronic mail distribution system according to a preferred embodiment of the present invention.

FIG. 3 illustrates an exemplary electronic mail distribution system (300) according to a preferred embodiment of the present invention. The electronic mail distribution system (300) as shown in FIG. 3 comprises a plurality of client machines (102, 110a to 110x) comprising personal computers, DOS machines, WINDOWS machines, Macintosh machines, Linux machines, dumb terminals, cellular telephones, PDA's, and other terminal devices. Client machines (102, 110a to 110x) may also be referred to herein as client computers or as information processing units. An information processing unit (102, 110a to 110x), according to a preferred embodiment of the present invention, comprises a reception unit for receiving a mail message and a transmission unit for transmitting the message into a network. A reception unit, according to one preferred embodiment of an information processing unit, may comprise a user interface for receiving a mail message composed by a user. Alternatively, the reception unit may comprise other types of interfaces for receiving and for storing a message, or message packets, destined for transmission as a mail message, or as message packets, in the electronic mail distribution system. The transmission unit may comprise, according to a preferred embodiment of the present invention, at least one of a modem, a network interface, a transceiver, a wireless transceiver, and other interfacing hardware and software. Also, the improved electronic mail distribution system of FIG. 3 further comprises a plurality of mail servers (104, 108a to 108n) and a plurality of routers (106a to 106f). Mail servers (104, 108a to 108n) and routers (106a to 106f) may also be referred to herein as intermediate nodes of the electronic mail distribution system (300). An intermediate node, according to a preferred embodiment of the present invention, comprises a reception unit that includes a network interface for receiving and for storing a message, or message packets, destined for transmission as a mail message, or as message packets, in the electronic mail distribution system. The intermediate node typically includes a processor operating according to software programs and memory coupled to the processor for storing information accessible by the processor. The processor utilizes software programs in the memory for determining whether to forward a received message to other nodes in the network. The processor receives message information, such as message packets, and stores this message information in the memory. After determining a "next hop" for a message, the processor forwards copy of the message information, e.g., message packets, to another node in the network. Additionally, according to an alternative preferred embodiment, the processor acknowledges ACK and/or NAK signals and retransmits message packets as may be necessary to forward a message, e.g., message packets, to another node in the network. Also, for reception of message information, e.g., message packets, the processor utilizes ACK and/or NAK signals to communicate with another node in the network, such as to coordinate retransmission of message packets in the network.

Figure 4A:
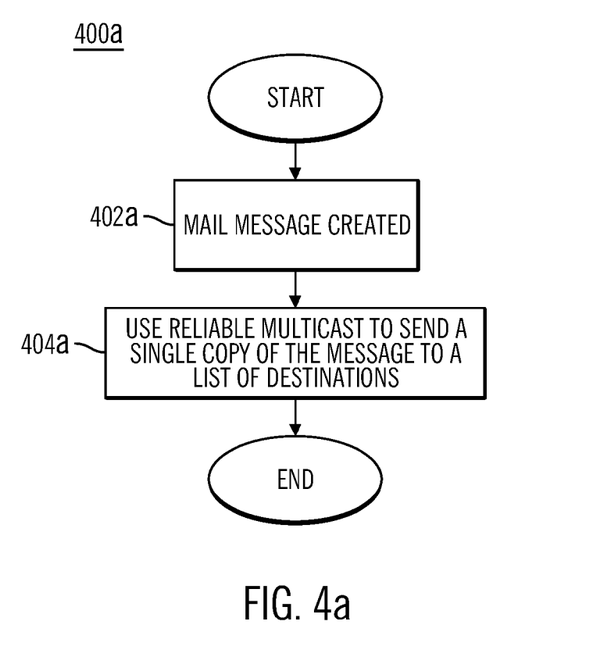
FIG. 4a illustrates an exemplary functional sequence of an electronic mail application program in accordance with a preferred embodiment of the present invention.
Figure 4B:
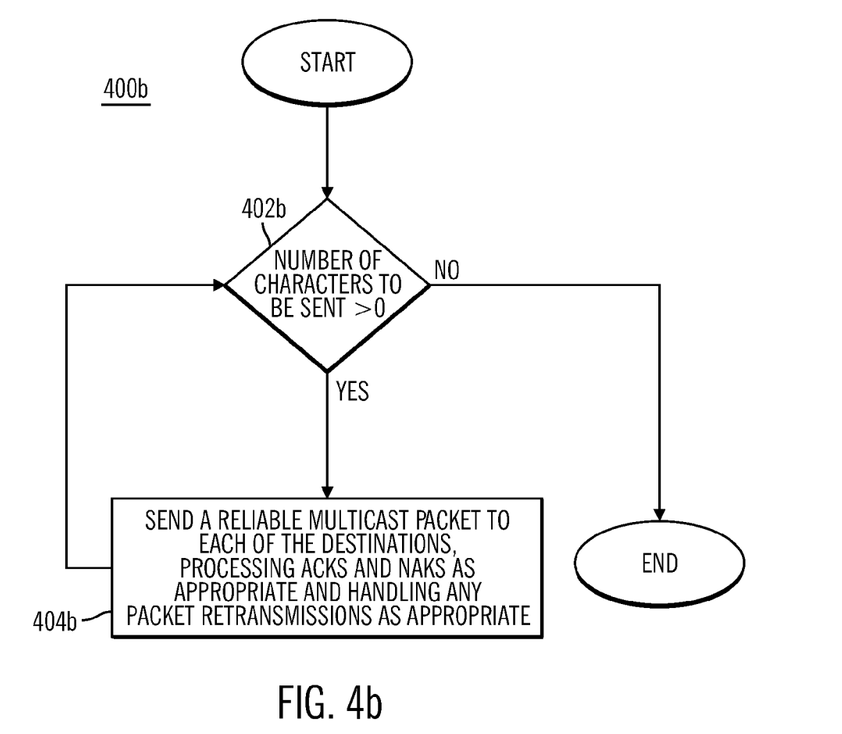
FIG. 4b illustrates an exemplary functional sequence of a reliable multicast software according to a preferred embodiment of the present invention.
Figure 4C:
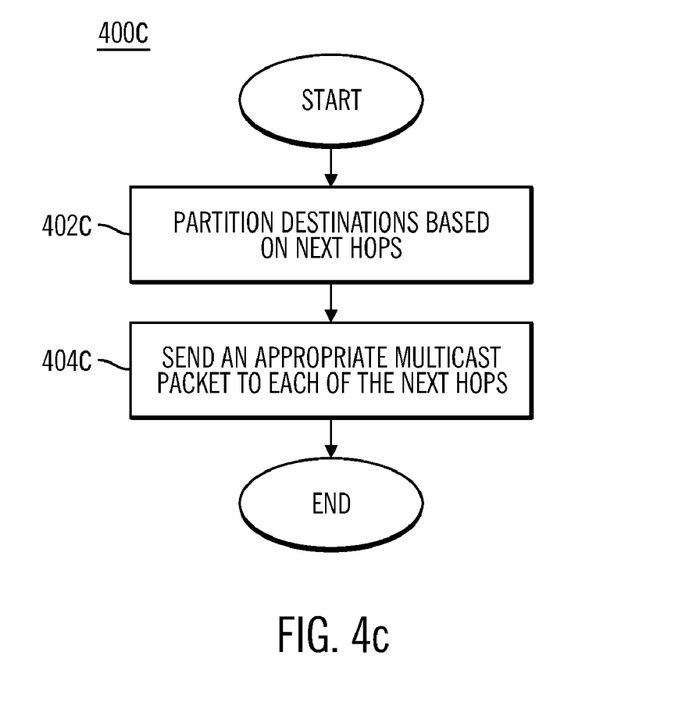
FIG. 4c illustrates an exemplary functional sequence of a reliable multicast software as practiced on intermediate nodes in accordance with a preferred embodiment of the present invention.

An electronic mail message (112a ... z) is composed on a client computer (102), the mail message (112a ... z) destined for reception by a plurality of recipients (a ... z) that correspond to mailboxes on destination mail servers (108a to 108n). Typically, the mail message (112a ... z) is transmitted from the client computer to a mail server (104) which is responsible for delivering the mail message (112a ... z) to the destination mail servers (108a to 108n). Typically, the mail message (112a ... z) is transmitted from the client computer (102) to the mail server (104) in one or more packets using the well-known TCP/IP protocols. In one embodiment of this invention, the mail server (104) transmits the mail message (112a ... z) to the destination mail servers (108a to 108n) using a reliable multicast protocol such as the Reliable Small Group Multicast (Reliable SGM) protocol such as described in application Ser. No. 09/329,101, filed on Jun. 9, 1999. In another exemplary embodiment of the present invention, the client computer (102) uses a reliable multicast protocol such as the Reliable SGM to transmit the message to the destination mail servers (108a to 108n). In either exemplary case, the source of the multicast packets (which in the examples can be the client machine (102) or the mail server (104)) sends a single stream of packets which are replicated at intermediate nodes acting as multicast routers so that an appropriate stream of packets reaches each of the destination mail servers (108a to 108n). For example, in FIG. 3, intermediate node 106c receives one or more packets from 106a and forwards copies of the packet or packets on to mail servers (108a and 108b). The intermediate nodes that are acting as multicast routers may use the Reliable SGM, such as described in application Ser. No. 09/329,101, or another multicast mechanism. The intermediate nodes that are operating as multicast routers, according to an alternative preferred embodiment of the present invention, could be IP routers, mail servers or other nodes that have been augmented with appropriate multicast function. Since normally one copy of the mail message (e.g., one copy of any part of the mail message) traverses any link in the network, the mail distribution system shown in FIG. 3 will be more efficient in terms of network bandwidth than existing mail distribution systems, such as shown in FIG. 1. FIGS. 4a, 4b and 4c, illustrate a preferred process for electronic mail message distribution in a reliable multicast system, according to a preferred embodiment of the present invention.

Mail Application Program Functionality

FIG. 4a illustrates an operational sequence (400a) of an electronic mail application program according to a preferred embodiment of the present invention. First, a mail message (112a ... z) is created (402a) and then the mail message (112a ... z) is distributed (404a) using a reliable multicast mechanism. As discussed above, the reliable multicast mechanism, according to a preferred embodiment of the present invention, utilizes the Reliable SGM mechanism such as described in application Ser. No. 09/329,101, or via another mechanism for reliable multicast. Also, as discussed above, the source of the multicast transmission preferably can be a client computer (102) or a mail server (104).

Reliable Multicast Software Functionality

FIG. 4b illustrates a functional sequence (400b) of a reliable multicast software package according to a preferred embodiment of the present invention. First, a determination is made as whether there is more message to transmit, such as whether there are more characters (i.e., there is more message) to be transmitted (402b). If there are no more characters (i.e., no more message) to be transmitted then the process ends. However, if there are more characters (i.e., more message) to be transmitted then the process sends a multicast packet to the destinations (404b). The reliable multicast software might also, in certain alternative embodiments, process acknowledgment packets or ACKs and/or negative acknowledgments or NAKs and perform re-transmissions as described in application Ser. No. 09/329,101. In other embodiments the ACKs and/or NAKSs and retransmissions might be handled by intermediate nodes such as routers. As mentioned above a variety of different reliable multicast schemes are possible. Error detection and correction protocols may also be used as is well known in the art. For specific implementations, the particular choice of a reliable multicast mechanism and the particular choices for error detection and correction protocols should be obvious to one of ordinary skill in the art in view of the discussion above.

Intermediate Node Multicast Functionality

FIG. 4c illustrates a functional sequence (400c) of a multicast software that is operational on intermediate nodes utilizing the reliable SGM mechanism according to a preferred embodiment of the present invention. First, when a packet is received, for example, the destinations associated with the packet are partitioned (402c) based on the next node that the packet should be sent to for delivering to each of the destinations. This next node is also known as a "next hop" that the packet should be forwarded to for delivering to each destination. According to a preferred embodiment, a "next hop" comprises a node, which can be an intermediate node or a destination node, to which a packet should be transmitted in a multicast transmission. Then, an appropriate multicast packet is sent (404c) to each of these "next hops", preferably as described in application Ser. No. 09/329,101. As mentioned above, other mechanisms for implementing a reliable multicast can also be used. Also, as mentioned above, the intermediate node multicast routing capability can be implemented on IP routers, mail servers or other nodes.

Mail Message

Figure 5:
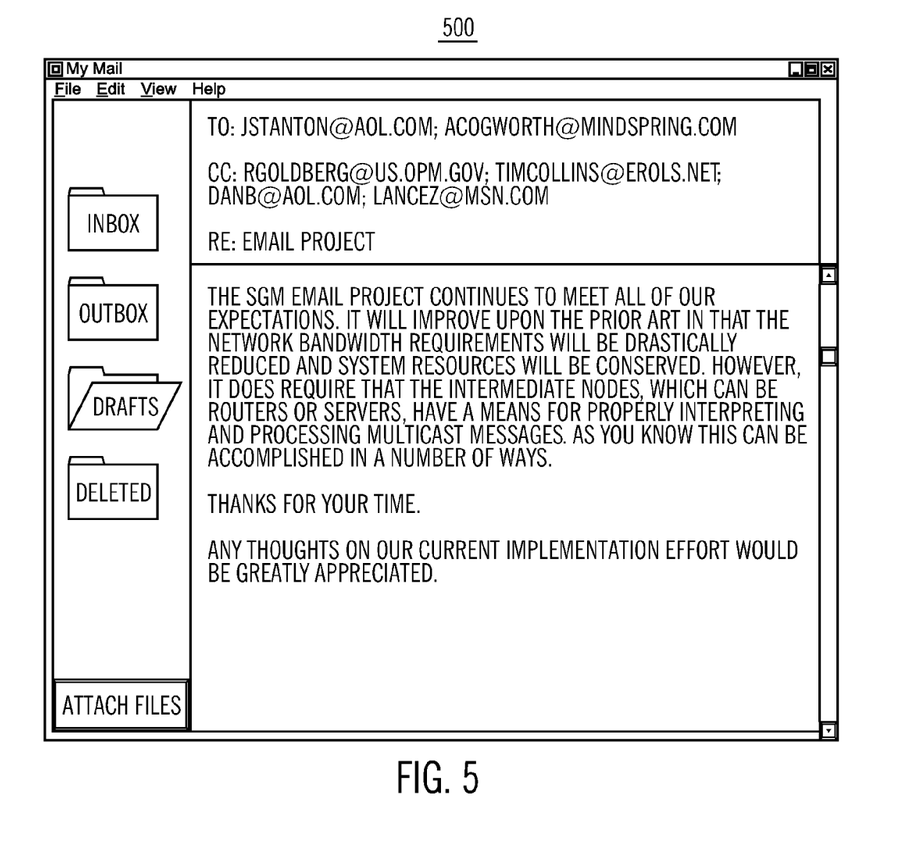
FIG. 5 illustrates an exemplary mail message for distribution in an electronic mail distribution system in accordance with a preferred embodiment of the present invention.

FIG. 5 illustrates a mail message (500) that utilizes an electronic mail distribution system as shown in FIG. 3. The mail message (500) of FIG. 5 contains two main mail recipients and four carbon copy recipients for a total of six recipients. The mailboxes for these six recipients might reside on five mail servers. A reliable multicast will be used to send copies of this mail message to each of the five mail servers. As stated above, the source of the multicast can be a client computer or a mail server. If the reliable SGM mechanism is used as described in application Ser. No. 09/329,101, the destination addresses that appear in the SGM packet are the addresses of the mail servers where the recipients have their mailboxes and these addresses would be used to route packets through the routers or intermediate nodes as described in application Ser. No. 09/329,101. Of course, it's also possible to use other mechanisms for reliable multicast as discussed above.

CONCLUSION

Multicast-enabled mail uses a reliable multicast scheme, such as Reliable Small Group Multicast or other reliable multicast scheme in a mail distribution system to improve efficiencies in the distribution of electronic mail. Multicast-enabled mail can be used to reduce the cost of network bandwidth in the Internet or in an enterprise network or to increase the usefulness of the existing bandwidth in a given network by making it possible to support more users or more applications in a given amount of network bandwidth.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Although specific embodiments of the invention have been disclosed, those having ordinary skill in the art understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for distributing electronic mail efficiently across a network of information processing units and intermediate nodes, the method on an information processing unit comprising the steps of:

receiving a mail message that is created and sent by a user, the user associating the mail message with a plurality of individual destinations; and sending a single copy of the mail message, in a multicast packet and using a reliable multicast technique, across the network via at least one intermediate node to the plurality of individual destinations, the plurality of individual destinations corresponding to a plurality of individual destination network addresses, wherein the multicast packet includes a packet header comprising the plurality of individual destination network addresses, wherein at least one of the plurality of individual destination network addresses is a unicast address, and wherein the mail message is destined for reception at the individual destination corresponding to the unicast address as an ordinary unicast packet.

2. The method as defined in claim 1, wherein the reliable multicast technique comprises a reliable Small Group Multicast technique.

3. An information processing unit for distributing electronic mail efficiently across a network of information processing units and intermediate nodes, the information processing unit comprising:

a reception unit for receiving a mail message with addresses corresponding to a plurality of individual destinations; and a transmission unit for sending a single copy of the mail message, in a multicast packet and using a reliable multicast technique, across the network via at least one intermediate node to the plurality of individual destinations, the plurality of individual destinations corresponding to a plurality of individual destination network addresses, wherein the multicast packet includes a packet header comprising the plurality of individual destination network addresses, wherein at least one of the plurality of individual destination network addresses is a unicast address, and wherein the mail message is destined for reception at the individual destination corresponding to the unicast address as an ordinary unicast packet.

4. The information processing unit as defined in claim 3, wherein the reliable multicast technique comprises a reliable Small Group Multicast technique.

5. The information processing unit as defined in claim 3, wherein the transmission unit operates according to a communication protocol to process ACKs and NAKs as well as packet retransmissions.

6. A method for distributing electronic mail across a network of information processing units and intermediate nodes, the method on an intermediate node comprising the steps of:

receiving a mail message in a multicast packet including a packet header comprising a plurality of individual destination network addresses, wherein at least one of the plurality of individual destination network addresses is a unicast address, and wherein the mail message is destined for reception at the individual destination corresponding to the unicast address as an ordinary unicast packet;

determining one or more "next hops" corresponding to the plurality of individual destination network addresses in the packet header for forwarding the packet;

replicating the packet for each "next hop"; and forwarding one copy of the packet to each of the "next hops".

7. The method as defined in claim 6, wherein the determining, replicating and forwarding steps operate according to a Small Group Multicast scheme.

8. The method as defined in claim 6, further comprising the step of:

repetitively executing the determining, replicating and forwarding steps for each newly received packet.

9. The method as defined in claim 6, further comprising the steps of:

processing ACKs and/or NAKs; and performing packet retransmissions.

10. The method as defined in claim 6, wherein the multicast packet comprises a Small Group Multicast packet.

11. An intermediate node for distributing electronic mail efficiently across a network of information processing units and intermediate nodes, the intermediate node comprising:

a reception unit for receiving a mail message in a multicast packet including a packet header comprising a plurality of individual destination network addresses, wherein at least one of the plurality of individual destination network addresses is a unicast address, and wherein the mail message is destined for reception at the individual destination corresponding to the unicast address as an ordinary unicast packet;

a determination unit for determining the "next hop" for each individual destination network address of the plurality of individual destination network addresses in the packet header; and a copying unit for replicating the packet for each of the "next hops".

12. The intermediate node as defined in claim 11, further comprising:

a forwarding unit for forwarding a copy of the packet to each of the "next hops".

13. The intermediate node as defined in claim 12, further comprising:

a repeater unit for repetitively executing the determining, duplicating and forwarding steps for each newly received packet.

14. The intermediate node as defined in claim 13, further comprising:

an acknowledge unit for processing ACKs and/or NAKs; and a retransmit unit for handling packet retransmissions.

* * * * *